United States Patent [19]
Rudder et al.

[11] 3,822,098
[45] July 2, 1974

[54] MULTISPECTRAL SENSOR MEANS MEASURING DEPOLARIZED RADIATION

[75] Inventors: Charles L. Rudder, Granite City; John C. Leader, Manchester; David P. Owsley; William A. J. Dalton, both of Florissant, all of Mo.

[73] Assignee: McDonnell Douglas Corporation, St. Louis, Mo.

[22] Filed: May 2, 1973

[21] Appl. No.: 356,511

[52] U.S. Cl............... 356/209, 250/339, 250/347, 356/88, 356/97, 356/212
[51] Int. Cl.................... G01n 21/48, G01j 3/42
[58] Field of Search............ 356/88, 93, 96, 97, 98, 356/173, 186, 189, 209, 211, 212; 250/339, 341, 347, 349, 350, 351, 353, 358, 360, 372

[56] References Cited
UNITED STATES PATENTS
2,481,034  9/1949  Neufeld ............................. 250/372
3,736,428  5/1973  Monroe ............................. 250/372

Primary Examiner—Vincent P. McGraw
Attorney, Agent, or Firm—Charles B. Haverstock

[57] ABSTRACT

A multispectral sensor including associated detection apparatus which are able to detect and identify radiations scattered from an object or substance, and particularly depolarized as distinguished from polarized radiations, which depolarized radiations are due to volume scattering characteristics, not surface scattering characteristics, and which enable the object or substance to be uniquely identified as to its material composition, color, density and other similar inherent characteristics as distinguished from surface characteristics, physical location and physical orientation. The present multispectral sensor can use laser means as well as other means for generating illumination or radiation.

22 Claims, 6 Drawing Figures

MULTISPECTRAL SENSOR MEANS MEASURING DEPOLARIZED RADIATION

When an electromagnetic wave is scattered from a target, its intensity will vary as a function of the scattering geometry, the wavelength, and the polarization of the scattered radiations. These characteristics of the scattered radiations which are uniquely ascribable to the target are known as the target's "signature." The scattering characteristics of different materials differ greatly and afford a distinctively different new way to identify, sense and analyze objects and materials.

The present invention is based on the principle that when an electromagnetic wave is scattered from a surface in the plane of incidence due to being exposed to radiations such as laser radiations, negligible depolarization occurs. Depolarization in this sense is defined as scattered radiations or waves with their polarization oriented orthogonal to that of the incident radiations or waves. Depolarization is observed in radiations scattered from almost all materials. It therefore follows that the observed depolarized radiations must arise from scattering mechanisms within the volume of the object or material itself, and not from surface reflective characteristics. This conclusion has been verified in a series of experiments and analyses involving the present multispectral sensor. The utility of this conclusion lies in the observation that, in the general scattering situation, the geometry and polarization are uncontrolled so that the scattered energy consists of an unknown mixture of both surface and volume scattered components.

The surface and volume scattering mechanisms of an object or material are fundamentally different from each other so that one might expect their spectral distributions to also be different. In fact, it may be shown that the spectral distribution of the surface scattered power depends on the refractive index of the material and the statistics of the surface roughness, whereas volume scattering is fundamentally related to the chemistry and other structural, as distinguished from surface characteristics of the material (for optical wavelengths) and is generally independent of the surface roughness. In general, the surface scattered power is significantly greater than that which is scattered or reradiated from within the volume of the material. This means that the spectral distrubution of the scattered energy from a target will in general vary as a function of the scattering geometry and polarization states of the incident beam and detector. By selectively detecting the depolarized scattered radiation in the plane of incidence, a method is at hand to filter the "noise" of the surface scattered spectrum and obtain a repeatable spectral shape. For remote sensing applications, the obvious choice of geometry is the back scatter direction which is a special case of the plane of incidence. This will be described more specifically.

There have been many attempts to obtain target signatures using various techniques, including techniques based on the spectral distribution of the reflectance from the target. Another approach has been based on the angular distribution of the plane polarization from the target, and still other approaches have been based upon the percentage of elliptical and/or circular polarization detected from radiations emitted or reflected from the target. These known techniques have usually been employed individually by means which respond only to the particular radiations being examined. So far as known, however, the combination of active, depolarized, multispectral measurements has not been investigated or employed by others.

One of the unique features of the present sensor that makes it different from other multispectral sensors, both active and passive, is in its ability to measure or detect only radiations scattered from the volume as distinguished from a combination of the volume and scattered radiation from the target. The depolarized radiation which is due to volume scattering has a relative intensity at different wavelengths independent of target orientation and when each wavelength is detected and comparatively analyzed enables targets to be uniquely identified and not merely separated and located as in a field of view. The more conventional sensors, including various radar type sensors and so forth, distinguished presence, locations and sometimes shapes, but they do not identify by composition or color.

The present multispectral sensor concept has two basic advantages over other known sensor systems, including (1) being able to identify spectral signatures as an invariant with respect to target orientation; and, (2) the present sensor offers the capability of being able to remotely identify materials or objects by their color and/or their composition instead of merely detecting their presence.

There are many possible applications and uses for the subject multispectral sensor and systems incorporating the same including uses in many scanning type systems and devices that are used to determine the color and composition of substances. With the present means particular objects can be more accurately detected and identified, and the advantages of being able to do this are numerous. This also enables identifying objects and substances by more and different criteria including identifying them by relatively subtle differences in composition, color and so forth. In addition, it can be used for other purposes as well such as to identify crop diseases and the source, location and identification of certain kinds of pollution, it can be used for meterological applications, it can be used to analyze the material composition of substances and to detect differences between substances, and it can be used for many other purposes. The present sensor is also adaptable for use as a scanning type sensor, and once it has obtained a signature for a particular object or target it can be processed and controlled as a cueing device to detect and identify objects or targets having similar characteristics in a field of view. Uses and applications for detection means having such capabilities for military and non-military purposes in addition to those uses mentioned are many and varied.

It is therefore a principal object of the present invention to provide means to identify objects and substances by their elemental composition and/or color.

Another object is to provide sensor means capable of responding to depolarized as distinguished from polarized radiations.

Another object is to be able to identify the composition and/or color of objects by detecting scattered radiations therefrom, which radiations can be detected with approximately the same ease regardless of the orientation of the objects relative to the detection means and independently of the surface characteristics of the object.

Another object is to provide means for more fully and more accurately identifying objects or targets.

Another object is to provide another means that can be used to analyze the composition of substances.

Another object is to teach the construction and operation of a relatively simple compact multispectral laser sensor.

Another object is to increase the amount of information that can be obtained about an object.

Another object is to provide sensor means which can be used for short as well as for long range observations.

Another object is to provide means capable of detecting reradiated (scattered) as well as reflected radiations including radiations produced by conventional light sources and radiations produced by laser means.

Another object is to identify objects by certain characteristics thereof including characteristics that are representative of light and other energy impinging thereon and reflecting therefrom including laser light, infrared light, microwave energy and the like.

These and other objects and advantages of the present invention will become apparent after considering the following detailed specification which discloses several different embodiments of the invention in conjunction with the accompanying drawings; wherein:

Figure 1:
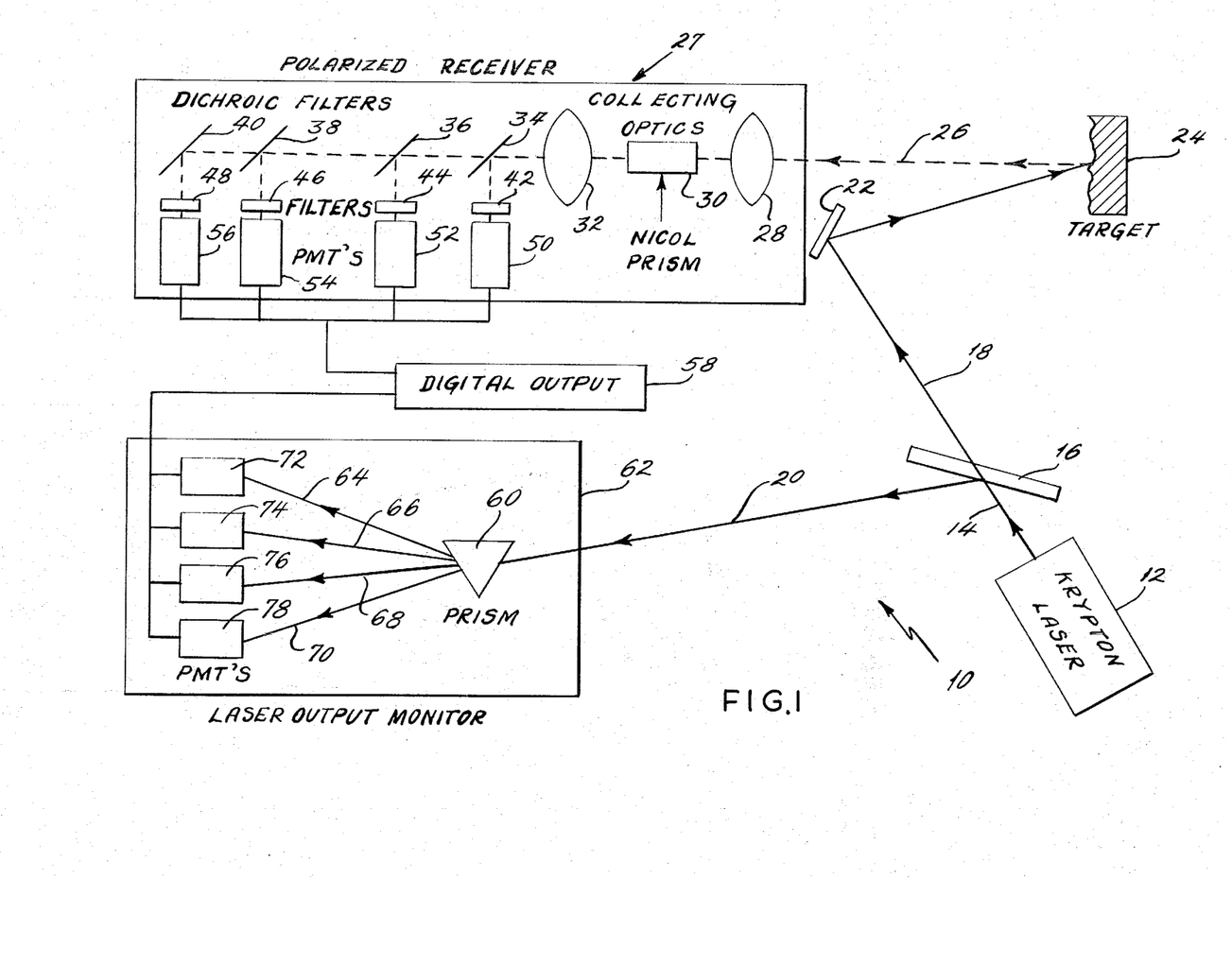
FIG. 1 is a schematic block diagram illustrating one embodiment of the subject multispectral sensor system.

Referring to the drawings more particularly by reference numbers, number 10 in FIG. 1 refers generally to a multispectral sensor system constructed according to one embodiment of the present invention. The system 10 includes a laser or other light or energy source identified as krypton laser source 12 which may be of convention construction. The laser 12 produces a polarized multispectral output laser beam 14 which impinges on a beam splitter element 16. Part of the beam passes directly through the beam splitter 16 and this part is labeled as beam 18, and another part of the beam 14 is reflected by the beam splitter 16 and forms the beam 20. The beam portion 18 impinges on a mirror or reflector 22 and is redirected or reflected thereby to impinge on a target 24. The target 24, in turn scatters electromagnetic energy as a result of the beam portion that impinges thereon. The target 24 is shown as being a rough surfaced object in the generalized situation and the energy radiations therefrom have two components one of which is due to the surface characteristics of the target and is referred to as the polarized portion of the scattered radiation. This portion of the target radiated energy is generally dependent upon the surface characteristics and orientation of the target.

The target also irradiates a second component which is a depolarized scattered component. This depolarized component which is due to volume scattering has a relative intensity as aforesaid that is substantially independent of the orientation of the target and this fact is made use of to enable the target to be uniquely identified when several spectral radiations are compared. This portion of the irradiated energy is also relatively independent of the surface characteristics of the target. A portion of this scattered depolarized radiation is identified in FIG. 1 by the dotted line 26. This irradiated depolarized energy will have wavelengths or frequency components which depend upon the frequency components of the laser beam, and some of these depolarized radiations taken over a predetermined area are gathered by collecting optics. These optics are illustrated in FIG. 1 and include the lens 28, the Nicol prism 30 and the lens 32. The radiations that pass through these optical elements are directed against a plurality of aligned filters such as dichroic filters 34, 36, 38 and 40. The filters 34-40 are constructed to pass certain wavelengths of the scattered radiations impinging thereon, and to reflect other portions thereof to associated filter elements 42, 44, 46 and 48. These filters in turn pass their outputs to respective photomultiplier tubes (PMTs) 50, 52, 54 and 56, or other types of detectors, which are coupled by connection means to the input of an output device 58. The detector devices used can have many different forms including being devices such as photocathode detectors, electric eye type devices, infrared detectors such as photosensitive semiconductor devices, certain junction devices, including any device capable of producing an electric signal when light or other electromagnetic energy impinges thereon, and so forth. The output device selected can also have many different forms including being a digital device, an analog device or a device including analog to digital converter means as a part thereof.

The reflected portion of the laser beam 20 is directed against a prism device 60 which is located in a laser output monitor 62. The prism 60 produces different wavelength output radiations 64, 66, 68 and 70 which correspond to the wavelengths which are selected by filter elements 42-48 and the associated dichroic filters 34-40. The respective outputs of the prism 60 impinge on respective photomultiplier tubes (PMTs) 72, 74, 76 and 78 and the outputs of these devices are coupled as second control inputs to the digital output device 58. Hence, the output device 58 receives inputs from two sources including selected scattered radiations from the targer 24 and corresponding wavelength outputs from the monitor 62. The monitor 62 will pass primarily only polarized radiations at the selected wavelengths for control purposes only while the receiver 27 will generate outputs that include more particularly the depolarized radiations which depend primarily on those characteristics of the target which are described as being the so-called volume scattering characteristics, and these are the radiations of primary concern to the present invention. The radiation energy due to volume scattering is depolarized and the wavelengths selected for analysis and measurement are the same wavelengths as those selected by the monitor 62 for control purposes. The control outputs of the monitor 62 are used to control the output of the device 58 so that an accurate analysis of the depolarized components is obtained. This is done because it is necessary to have some form of monitor means so that fluctuations that occur in the output of the laser can be taken into account in evaluating and comparing the outputs that are sensed. It is even contemplated to automatically control or stabilize the output of the laser itself.

Figure 2:
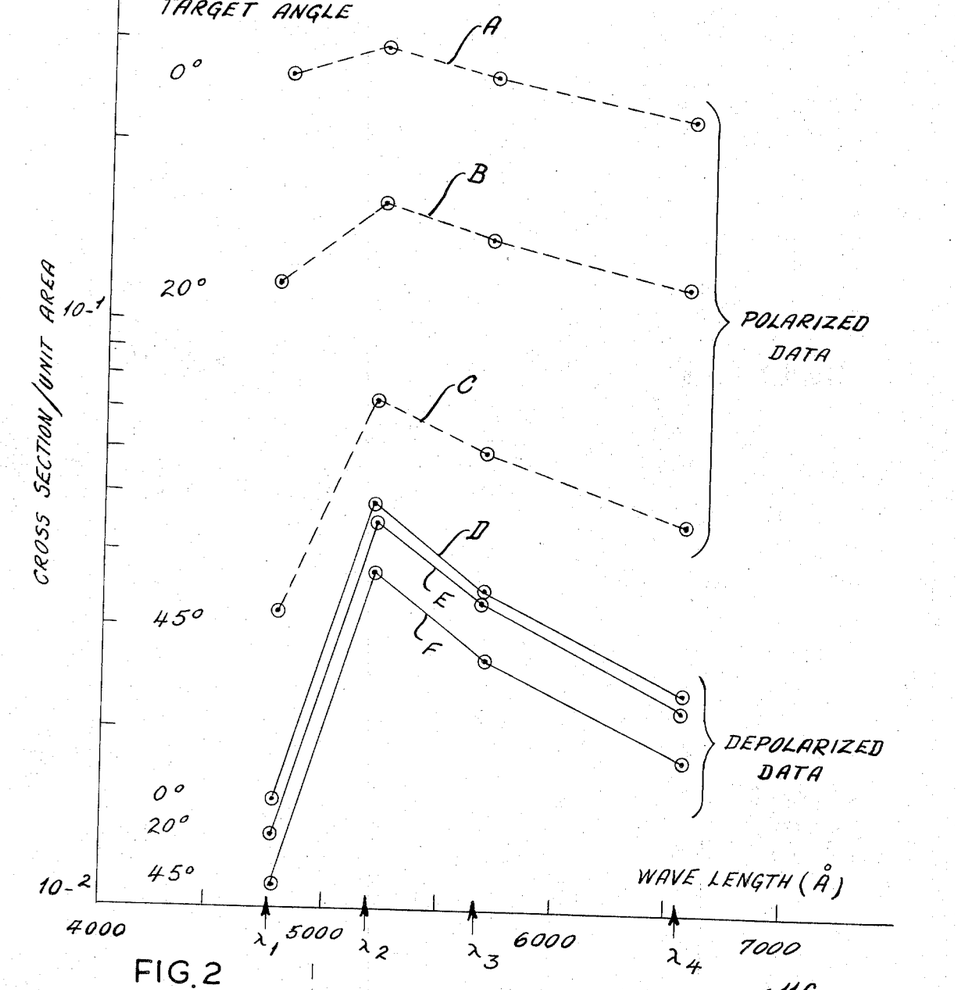
FIG. 2 is a graph on a unit area basis, plotted as a function of wavelength and illustrating typical multispectral narrow bandwidth data.

FIG. 2 is a graphical representation showing the cross-section per unit area for a single target as determined with the output of the subject device emitting at four different wavelengths impinging on the target. Angle of incidence of the impinging energy is an implicit parameter. The upper three curves labeled A, B and C represent the relative magnitudes of polarized light components detected by the subject device as taken at four different selected wavelengths such as the four wavelengths which are detected by the device of FIG. 1. The curve A represents the magnitudes of the detector outputs at different selected frequencies or wavelengths when the target is oriented at or close to an angle of 0° relative to the optical axis of the optical means included in the receiver 27. Curve B shows the magnitudes at the same wavelengths as detected when the target is oriented at an angle of 20° relative to the optical axis of the receiver 27, and the curve C shows the magnitudes at the same wavelengths when the target is oriented at an angle of 45° relative to the axis of the receiver 27. It should be noted for curves A, B, and C that the amount of polarized light detected at the selected wavelengths drops off relatively substantially as the angle or orientation of the target increases relative to the zero orientation condition and the drop off is not proportionately the same at each wavelength. Comparison of these curves shows a relative change in shape as the angle of incidence changes. For other target materials this change can be even more dramatic than illustrated.

The lower three graph lines or curves in FIG. 2 are labeled D, E and F and are formed by connecting the detected outputs at the same wavelengths but for the depolarized as distinguished from the polarized portions of the outputs. Graph line D corresponds to curve A in that it represents the detected outputs when the orientation of the target is at an angle of approximately 0° relative to the axis of the receiver 27, and therefore represents the depolarized outputs under the same condition as for the polarized outputs in curve A. In like manner, graph E represents the depolarized condition when the target is oriented at 20° relative to the optical axis of the receiver at the same wavelengths that correspond to the polarized outputs in curve B. Curve F shows the depolarized equivalent to curve C and is taken with a target orientation of 45°.

The significance of FIG. 2 is that it shows that there is relatively little change in the detected spectral shape of the depolarized backscattered radiations for changes in the angular orientation of the target as compared to the changes that occur in the polarized backscattered radiations for the same corresponding angular orientations. In particular, the shape of the curves remains constant. This is a significant observation because, as explained, the polarized outputs are primarily due to the surface scattering characteristics of the target and therefore vary in magnitude significantly as the target presents various aspect angles to the incident radiation while the polarized outputs which are a function of the volume scattering of the target are relatively little affected by the angular orientation of the target. This means that the target or any object or substance will have a "signature" that results from the scattering properties inherent in the target. Furthermore, it is only necessary to sample the scattering properties at several discrete wavelengths to collect signature data adequate to identify the target material. A signature therefore represents certain inherent characteristics of the object or target such as its composition, color, or other inherent internal chemical or structural characteristics as distinguished from its surface and surface reflective characteristics. Furthermore, knowledge of the signature of an object or substance can be useful for many purposes including those indicated above. For example, it can be used to identify or describe objects by their so-called inherent qualties or color as distinguished from simply knowing of their presence or their orientation or their surface characteristics.

Figure 3:
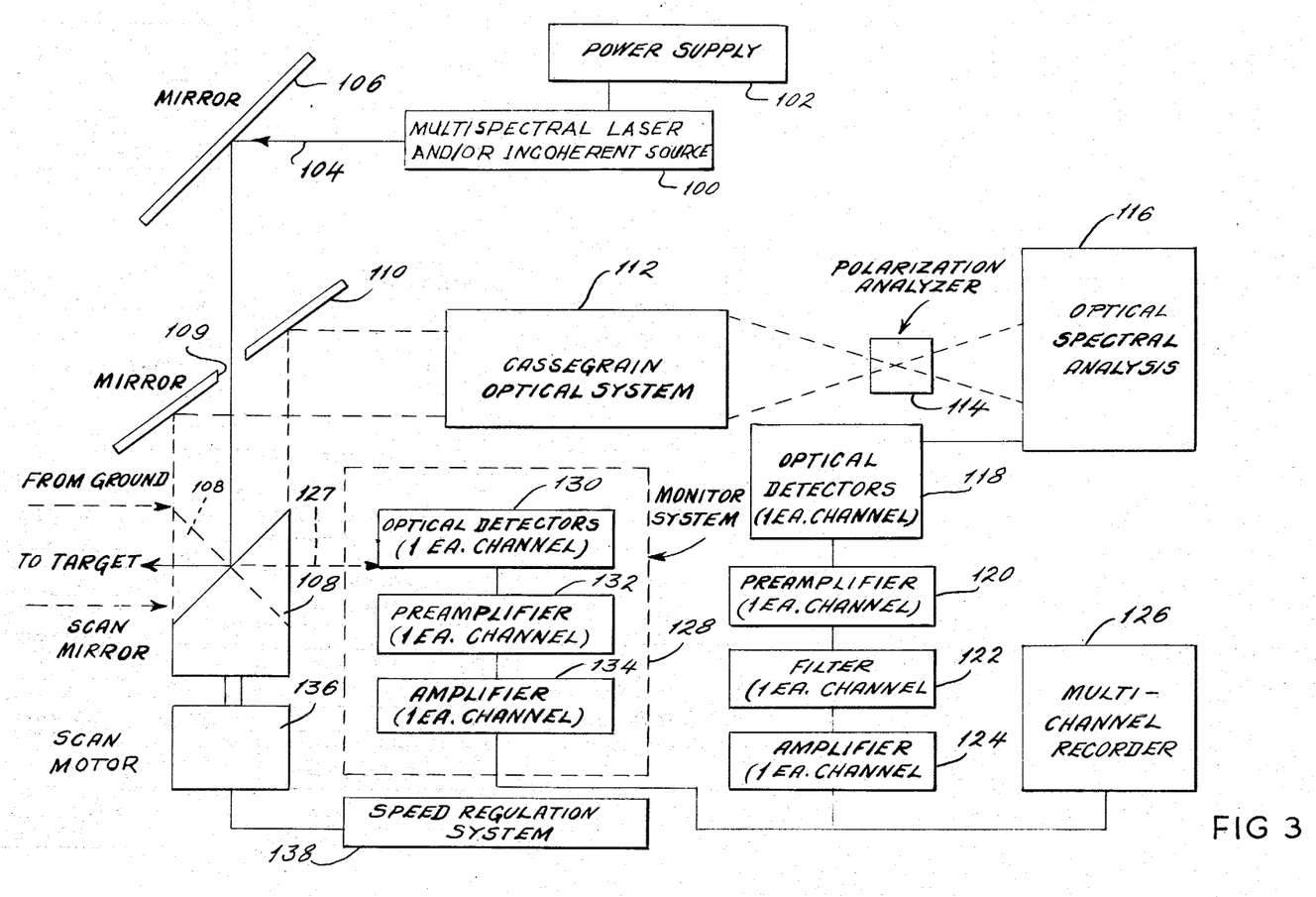
FIG. 3 is a block diagram showing another embodiment of a multispectral sensor system.
Figure 4:
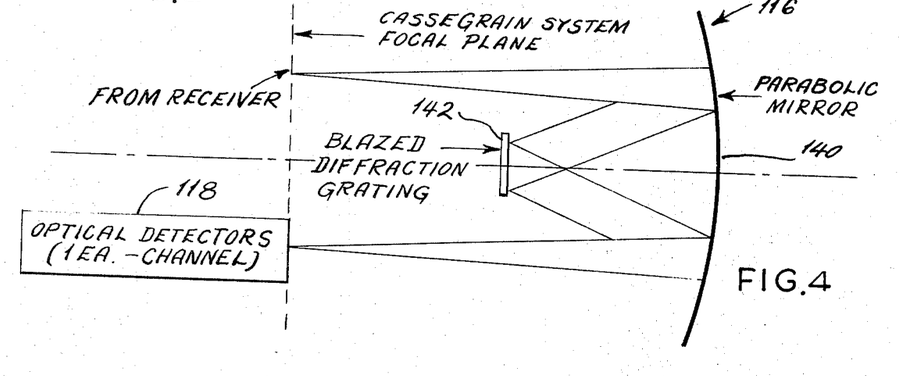
FIG. 4 is an enlarged view showing more of the details of the optical system employed in the subject sensor.

FIG. 3 is a block diagram of another embodiment of the subject sensor. In FIG. 3, the construction shown has a krypton and/or other laser source 100 which is energized by a power source 102, and its output beam 104 is reflected by impinging on a mirror 106. The reflected beam thereafter impinges on another mirror referred to as scan mirror 108 and in so doing the beam passes through an aperture 109 in another mirror 110. The reflected beam impinging on the scan mirror 108 is reflected therefrom to the target or other object from which some scattered radiation occurs that also impinges on the surface of the scan mirror 108 and is reflected thereby onto the mirror surface of the mirror 110. The reflected scattered radiation impinging on the mirror 110 are reflected into an optical system which is identified in the drawing as the cassegrain optical system 112. The details of the cassegrain optical system are shown in FIG. 4 and will be described later. The output of the optical system 112 is directed to a polarization analyzer device 114 and from there is directed to an optical spectral analyzing means 116. The means 116 produce outputs which are applied to optical detector devices such as the device 118. One such detector device is provided for each channel or each wavelength that is considered. Each of the detectors 118 applies its output to a respective preamplifier 120 the outputs of which are applied respectively to filters 122 and amplifiers 124. The output from each similar channel which includes a detector, a preamplifier, a filter and an amplifier is fed to a multi-channel recorder 126 which is similar to or analogous to the digital output means 58 shown in FIG. 1.

At the same time that the recorder 126 is receiving inputs from each of the several different channels it receives periodically other inputs at the same selected wavelengths from other channels. These other channels receive their inputs from the source 100 which inputs are those that pass directly from the scan mirror 108 as this element rotates (see dotted outline). These are the radiations that appear at dotted line 127 and include only the radiations from the source and not from the target which is not true of the radiations that are detected by the elements 110, 112, 114, 116, 118, 120, 122 and 124. These other channels which are shown in FIG. 3 located in a monitoring system 128 each includes an optical detector 130, a preamplifier 132 and an amplifier 134. One such channel is provided for each detected wavelength. The outputs of these channels are fed as second inputs to the multi-channel recorder 126 in a manner similar to the system of FIG. 1.

The sensor system shown in FIG. 3 also includes a scan motor 136, which drives the scan mirror 108 so that the laser beam will scan or sweep a predetermined area of the target or an area in which one or more targets may be located and will modulate the responses. The scan motor 136 is under control of speed regulator means 138 which may be of conventional construction.

FIG. 4 shows the details of a special optical spectral analysis system for use as the element 116 in FIG. 3. The system 116 includes a parabolic mirror 140 positioned to receive radiations from the receiver means including from the mirror 110, cassegrain optical system 112, and polarization analyzer 114. The parabolic mirror 140 reflects these radiations onto the surface of a defraction grating device 142 which reflects them back onto a different portion of the parabolic mirror 140. From there the radiations are reflected onto an optical detector means shown generally in FIG. 4 as the optical detector means 118. One channel is associated with each of the detectors and the channels are constructed to respond to, to amplify and to pass or filter only selected wavelengths of the radiations impinging thereon.

Figure 5:
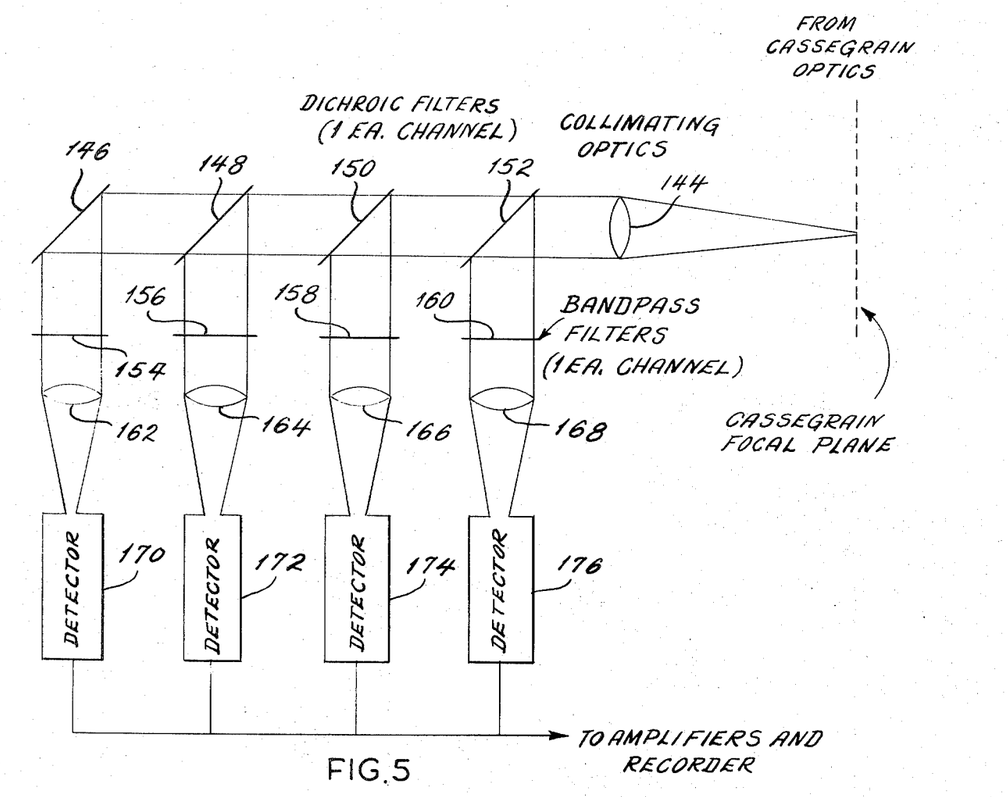
FIG. 5 shows an embodiment of the subject filter and detector means which receives the outputs of the means shown in FIG. 4; and, FIG. 6 is a schematic diagram showing another embodiment of the subject multispectral sensor system.

FIG. 5 shows another alternate embodiment of the channel optics associated with the detector means 27 (FIG. 1) and an alternate to the optical systems shown in FIG. 4. The optics of FIG. 5 include a collimating lens 144 through which the output of the optical system passes. This output is directed against a plurality of spaced dichroic filters 146, 148, 150 and 152, which are positioned to reflect the radiations impinging thereon to respective bandpass filters 154, 156, 158 and 160. The radiation wavelengths that are passed by the respective filter systems 146–152 and 154–160 are those wavelengths which are selected for analysis. These selected wavelengths are then directed to associated channel lenses 162, 164, 166 and 168 and from there to associated detectors 170, 172, 174 and 176 which may be identical to the detectors 50–56 of FIG. 1, and the outputs of the detectors are amplified and fed to the multi-channel recorder means such as the recorder means 126 (FIG. 3).

The multispectral sensor device illustrated in FIGS. 3–5 is very similar and operates similarly to the construction shown in FIG. 1, but differs therefrom primarily in the use of a different form of optical means to achieve a scanning system.

Figure 6:
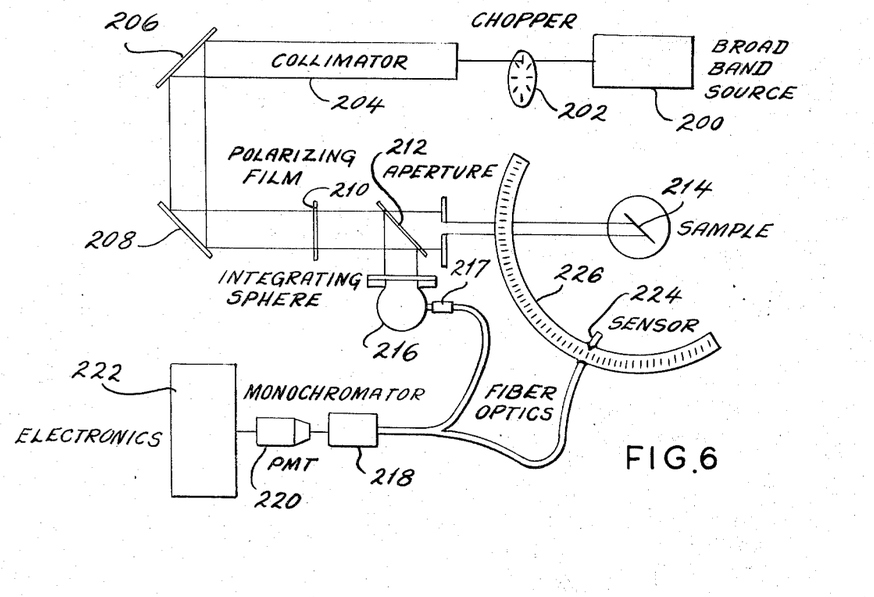

FIG. 6 shows another embodiment of the subject device which achieves a similar result but uses a somewhat different embodiment. The embodiment of FIG. 6 is shown having a broad band light source 200 which may be a laser light source or any other desired source of radiation including normally incoherent sources. The output of the source 200 is directed against a rotating light chopper device such as a perforated disc 202 that chops the output into distinct radiation bundles or pulses that are fed to and through a collimator device 204. The radiations fed to the collimator are reflected by mirrors 206 and 208 and then pass through a polarizing device 210 which may be a film, a crystal or other optical device or it may be a wire grating where other forms of radiation are used, and the outputs of the device 210 are directed at a beam splitter device 212. Part of the radiation impinging on the beam splitter 212 passes directly through and is directed against a sample substance or target 214, and the other portion of the radiation energy impinging on the beam splitter 212 is reflected thereby and passes to an integrating device 216 which is shown as being an integrating sphere.

The integrating sphere 216 has an output connection or probe 217 that is connected by means such as a fiber optic bundle to a monochromator device 218 which has its output connected to the input of a photomultiplier device (PMT) 220. The outputs sensed by the probe 217 are responsive to fluctuations in the intensity of the source and are used for control purposes. The PMT 220 in turn has its output connected to the input of an electronic circuit means 222 which may include recorder means. The portion of the radiation energy that impinges on the target or specimen 214 is scattered therefrom and selected wavelengths of this scattered depolarized radiation is sensed by another sensor device which is shown as being on an adjustable probe 224 mounted for movement on an arcuate scale member 226. The sensor element 224 is connected by another lead to another input of the monochromator 218, and the signals sensed by the sensor 224 are those to be analyzed and measured and the outputs of the monochromator 218 are fed to the electronics and/or recorder means 222. The embodiment of FIG. 6 is somewhat similar to a known device used for measuring polarized, not depolarized components, and is also similar to other embodiments disclosed herein in comparing and/or analyzing and detecting selected wavelengths of the polarized and depolarized radiation components. The main difference between the embodiment of FIG. 6 and the other disclosed embodiments is that the FIG. 6 embodiment is designed more particularly to operate on one wavelength at a time while the other embodiments may be able to handle and analyze a plurality of wavelengths simultaneously.

When the subject sensor is constructed to be operated employing scanning principles as disclosed in the embodiment of FIG. 3, for example, the multispectral energy, when properly collimated and/or focused, is caused to sweep through a volume and be sequentially incident upon several targets or target portions which are spacially distributed within the volume being scanned. The same or a separate scanning means appropriately synchronized, may also be used to restrict or control the scattered energy collected in order to make it correspond spacially and temporally to the volume or area being illuminated or irradiated. Furthermore, as indicated, the electromagnetic transmissions or radiations directed at the target or targets may be coherent energy transmissions such as those generated by certain lasers and radar transmitters and may also be incoherent radiation transmissions especially in those cases where the distances involved are relatively short. All of these and other factors may affect the operating range and other characteristics of the device and they may affect the ability of the device to be able to select and/or produce the desired wavelengths. These and other conditions may also affect the application, usefulness and purpose for which the device is used. Other factors which may affect the results include the power of the transmitter, the sensitivity of the detector means, the width of the radiation or energy beam being used or detected, the propagation conditions, and the range over which useful information can be obtained.

The present device has many possible uses and applications including applications involving industrial control, especially where the range requirements are relatively short such as up to about a meter or so, and it can be used in many possible military and civil applications including applications where the target or other remote objects in question may be at ranges up to 10,000 meters and even further.

It should be recognized and taken into consideration when considering the present device, that when electromagnetic radiations traverse a material by impinging thereon, their intensity is reduced both by absorption and by scattering. In the case of the scattered loss or attenuation, the electromagnetic energy taken from the incident beam is reradiated from each scattering center and in the process becomes lost or dispersed from the main energy source or beam. This is true because these reradiations travel in altered directions. Furthermore, scattering always results from some type of material heterogeneity. For conductive surfaces, the electromagnetic scattering that occurs, occurs principally because of the surface characteristics since for conductive surfaces, the electromagnetic energy penetration is relatively limited. Consequently, surface scattering provides the major contribution to electromagnetic scattering particularly from most metals and alloys. In the case of dielectric materials, however, the electromagnetic radiations are able to penetrate further into the object or target, and scattering therefore is more from the entire material and is due to what has been referred to as the volume scattering as distinguished from the surface scattering characteristics. For purposes of the invention, the volume scattered component of the radiation is the more significant portion of the total scattered radiations.

Experimentations and calculations show that polarized electromagnetic radiations scattered from a rough surface are not significantly depolarized in the plane of incidence. Consequently, depolarized radiations that are received at the detector result from the so-called depolarization effects which are relatively independent of the surface characteristics and of the orientation and location of the target relative to the direction of the radiations impinging thereon. When the polarized component of the detected radiations are eliminated, a target signature is obtained which is based on some inherent characteristics of the material being irradiated. The present invention provides means for developing data from which the polarized and depolarized scattered field intensity can be relatively accurately calculated. No known device has been able to produce data which makes such calculations possible. Consequently, target signature identification due to the depolarization effects of radiations impinging thereon offers considerable promise as a new technique.

Thus there has been shown and described various embodiments of a novel multispectral sensor device which can be used to identify objects or substances by certain signature characteristics thereof which are independent of the material surface characteristics, orientation, and location, and depend instead on the so-called volume characteristics which have to do with certain inherent characteristics of an object or substance such as its chemical, structural, electrical, color and other inherent characteristics. Many changes, modifications, variations, and other uses and applications of the present sensor will become apparent to those skilled in the art after considering this specification and the accompanying drawings. All such changes, modifications, variations and other uses and applications which do not depart from the intention and scope of the invention are deemed to be covered by the invention which is limited only by the claims which follow.

What is claimed is:

1. A multispectral analysis device for use in uniquely identifying objects having areas to be irradiated comprising a source of electromagnetic energy producing output energy at at least two different wavelengths and at a known polarization, means to direct a portion of said energy against an area of the object to be uniquely identified so that at least some of the reradiations from said area are depolarized and are due primarily only to the inherent characteristics of the object itself as distinguished from the surface reflective characteristics thereof, means positioned to respond to said reradiation depolarized energy including means positioned to collect some of said depolarized reradiations scattered from the object, filter means associated with the collecting means and positioned to respond to and to segregate selected wavelengths only of said depolarized reradiated energy corresponding to the wavelengths from said source, means to detect the outputs of said filter means and to produce separate electric responses for the selected depolarized wavelengths, and analyzer means for comparing the detector outputs to produce indications as to the magnitudes and relative magnitudes of the energy at the selected wavelengths to uniquely identify the object being irradiated.

2. The multispectral analysis device of claim 1 wherein the analyzer means include other means for selecting and passing energy from said source at the selected wavelengths and producing electric control responses proportional to the magnitude of the energy at the respective selected wavelengths, said analyzer means also including means responsive to fluctuations in the intensity of the energy from the energy source at the said selected wavelengths.

3. A multispectral sensor for use in uniquely identifying an object having an area thereon to be irradiated comprising means for generating and transmitting electromagnetic waves at at least two different selected wavelengths at the area of the object to be irradiated, the inherent characteristics of said object causing some of the energy impinging thereon at the said wavelengths to reradiate therefrom as scattered depolarized reradiations of the same wavelengths, means positioned to collect and respond to some of said reradiated depolarized energy from said object, said last named means including filter and detector means positioned and constructed to produce output electric responses at the said wavelengths of said depolarized reradiation energy, and analyzer means responsive to the electric responses at the said selected different wavelengths to determine the relative spectral distribution thereof in the depolarized energy reradiated by the object, said last named means including means for indicating the magnitudes and relative magnitudes of the energy at the different selected wavelengths.

4. The multispectral sensor defined in claim 3 including means to cause the transmitted electromagnetic waves to scan the area of the said object.

5. The multispectral sensor defined in claim 3 including a plurality of spaced objects and means to cause the transmitted electromagnetic waves to scan the region in which the said spaced objects are located.

6. The multispectral sensor defined in claim 3 wherein said means positioned to collect and respond to the reradiated energy include means to scan the area of the object being irradiated so as to restrict the scattered depolarized reradiated energy collected so that the electric responses produced occur spatially and temporally relative to the area of the irradiated object.

7. The multispectral sensor defined in claim 4 wherein said means positioned to collect and respond to the reradiated scattered depolarized energy include means to cause said collecting and responding means to scan the area of said object to restrict the scattered energy collected so that the responses occur spatially and temporally relative to the surface of the irradiated object, and means associated with the means positioned to collect and respond to the reradiated energy to synchronize the said scanning means associated therewith with the scanning means associated with the means that transmit electromagnetic waves.

8. The multispectral sensor defined in claim 3 wherein said means to collect and respond to the reradiated energy includes optical means.

9. A multispectral sensor for uniquely identifying a target having an area thereon to be irradiated by energy of selected wavelengths comprising a relatively broadband source of electromagnetic radiations, means including beam splitter means positioned to receive radiations from said source and constructed to divide the radiation energy from said source into separate first and second energy beams, means positioned in the path of the first energy beam including filter means constructed to pass only particular selected bands of wavelengths of the energy of said first beam, said second energy beam being directed at the area of the target to be irradiated whereby said area reradiates scattered depolarized energy at the said selected wavelengths, the inherent characteristics of the target including its chemical composition, electrical characteristics, color and structural characteristics effecting the magnitudes and relative magnitudes of the scattered depolarized reradiation at said selected wavelengths, means positioned to collect and to respond to the selected depolarized reradiations from the target, said last named means including filter means constructed to pass selected ones of the selected scattered depolarized wavelengths, detector means to generate electric signal responses corresponding to each of the said selected depolarized wavelengths, and analyzer means responsive to the electric signal responses to produce indications as to the magnitudes and relative magnitudes of the depolarized reradiations at the selected wavelengths, said analyzer means including means responsive to variations in the intensity of the electromagnetic radiations from the source at the particular wavelengths and including means to make the indications generated relatively independent of variations in the source.

10. The multispectral sensor defined in claim 9 wherein said means positioned to collect and respond to the scattered depolarized radiations include optical means.

11. The multispectral sensor defined in claim 9 wherein said broadband source of electromagnetic radiations is a laser source.

12. The multispectral sensor defined in claim 9 wherein said broadband source of electromagnetic radiations is a source of coherent radiation energy.

13. The multispectral sensor defined in claim 9 wherein said broadband source of electromagnetic radiations is a source of incoherent radiation energy.

14. The multispectral sensor defined in claim 9 wherein said beam splitter means reflects said first energy beam so that the first and second energy beams are oriented at an angle relative to each other.

15. The multispectral sensor defined in claim 10 wherein the optical means positioned to collect and respond to some of the reradiation energy include cassegrain optical means.

16. The multispectral sensor defined in claim 9 wherein said first energy beam is reflected by the beam splitter, and optical means positioned to intercept the said reflected first energy beam.

17. The multispectral sensor defined in claim 9 wherein said detector means include photo-multiplier means.

18. Means for monitoring selected frequencies of energy reradiated from an object having an area to be irradiated comprising a relatively broadband source of radiation energy and means for directing energy from said source at the area of said object, said object area reradiating some of the energy impinging thereon, at least some of which reradiated energy is characterized by being scattered depolarized reradiations due to certain inherent characteristics of the object itself rather than being due to the reflective characteristics of the irradiated area, means positioned to respond to selected frequencies of the depolarized reradiations from said object including an energy sensor probe and means including monochromator means connected to said probe, said monochromator means producing signal responses to represent the intensity of the detected reradiation energy sensed by the energy sensor probe at a selected frequency, means to produce indications as to the magnitude of the responses, and means to relocate the energy sensor probe so that it can respond to different preselected frequencies of the reradiated depolarized energy.

19. The means defined in claim 18 including means for producing signals that vary in response to variations in the intensity of the broadband source, and means to apply the signals to the monochromator means to make the signal responses therefrom relatively independent of the intensity of the source.

20. The means defined in claim 18 including means to chop the output radiations from the broadband source into spaced radiation bundles.

21. Means for monitoring selected frequencies of energy reradiated from an object having an area to be irradiated comprising a relatively broadband source of radiation energy and means for directing energy from said source at the area of said object to be irradiated whereby said object reradiates energy having polarized and depolarized components, the depolarized reradiation components being primarily due to the inherent characteristics of the object itself rather than to the surface reflective characteristics thereof, means positioned to respond to some of the depolarized reradiation energy from said object including filter means for passing depolarized reradiated energy at selected wavelengths only, detector means for producing signal responses at the said selected wavlengths, and output means responsive to said signal responses for producing indications as to the magnitudes and relative magnitudes of the depolarized reradiated energy at the selected wavelengths.

22. The means for monitoring defined in claim 21 including other means positioned to respond to the energy from the broadband source at the said same selected wavelengths to produce respective signal outputs, and control means associated with the output means including means responsive to the signal outputs of said other means, said control means including means to make the indications of said output means relatively independent of changes in the intensity of the radiation source.

\* \* \* \* \*

UNITED STATES PATENT OFFICE
CERTIFICATE OF CORRECTION

Patent No. 3,822,098　　　　　　　Dated July 2, 1974

Inventor(s) Charles L. Rudder et al

It is certified that error appears in the above-identified patent and that said Letters Patent are hereby corrected as shown below:

Column 2, line 40, "meterolog-" should be "meteorolog-".

Column 5, line 62, "polarized" should be "depolarized".

Signed and sealed this 1st day of October 1974.

(SEAL)
Attest:

McCOY M. GIBSON JR.
Attesting Officer

C. MARSHALL DANN
Commissioner of Patents